US012793895B2

(12) United States Patent
Ikebe et al.

(10) Patent No.: US 12,793,895 B2
(45) Date of Patent: Nov. 10, 2026

(54) CERAMIC ELECTRONIC COMPONENT

(71) Applicant: Murata Manufacturing Co., Ltd., Nagaokakyo (JP)

(72) Inventors: Syouta Ikebe, Nagaokakyo (JP); Yasuhiro Nishisaka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 148 days.

(21) Appl. No.: 18/766,895

(22) Filed: Jul. 9, 2024

(65) Prior Publication Data

US 2024/0363287 A1 Oct. 31, 2024

Related U.S. Application Data

(63) Continuation of application No. PCT/JP2023/008612, filed on Mar. 7, 2023.

(30) Foreign Application Priority Data

Mar. 18, 2022 (JP) ................................ 2022-044135

(51) Int. Cl.
*H01G 4/30* (2006.01)
*H01G 4/008* (2006.01)
*H01G 4/012* (2006.01)

(52) U.S. Cl.
CPC ............ *H01G 4/012* (2013.01); *H01G 4/008* (2013.01); *H01G 4/30* (2013.01)

(58) Field of Classification Search
None
See application file for complete search history.

(56) References Cited

U.S. PATENT DOCUMENTS

2020/0267832 A1 8/2020 Koyama
2020/0303123 A1 9/2020 Lee et al.
2021/0183581 A1* 6/2021 Nakano ................ H01G 2/065
2021/0366657 A1* 11/2021 Sakai ..................... H01G 4/30
2022/0024814 A1* 1/2022 Ookawa ................ C03C 17/22
(Continued)

FOREIGN PATENT DOCUMENTS

JP S6451613 A 2/1989
JP 2004100014 A 4/2004
(Continued)

OTHER PUBLICATIONS

International Search Report in PCT/JP2023/008612, mailed May 23, 2023, 3 pages.
(Continued)

*Primary Examiner* — Dion R. Ferguson
(74) *Attorney, Agent, or Firm* — Keating & Bennett, LLP

(57) ABSTRACT

A ceramic electronic component includes a ceramic body including an internal electrode layer, and an outer electrode on a surface of the ceramic body and electrically connected to the internal electrode layer. The outer electrode includes a base electrode layer including a $SiO_2$—BaO—$B_2O_3$—CaO-based glass, a protective layer covering a surface of the $SiO_2$—BaO—$B_2O_3$—Cao-based glass exposed on a surface of the base electrode layer and including at least one of P, S, C, Si, Ba, F, N, Al, Sr, or B, and a Ni plating layer covering the base electrode layer and the protective layer.

17 Claims, 2 Drawing Sheets

(56) References Cited

U.S. PATENT DOCUMENTS

| | | | | |
|---|---|---|---|---|
| 2022/0102075 | A1* | 3/2022 | Kitahara | H01G 4/30 |
| 2022/0102077 | A1* | 3/2022 | Kitahara | H01G 4/1218 |
| 2024/0363287 | A1* | 10/2024 | Ikebe | H01G 4/40 |

FOREIGN PATENT DOCUMENTS

| | | | |
|---|---|---|---|
| JP | 2007242706 | A | 9/2007 |
| JP | 2007294633 | A | 11/2007 |
| JP | 202072246 | A | 5/2020 |
| WO | 2020241122 | A1 | 12/2020 |

OTHER PUBLICATIONS

Written Opinion in PCT/JP2023/008612, mailed May 23, 2023, 5 pages.

* cited by examiner

CERAMIC ELECTRONIC COMPONENT

CROSS REFERENCE TO RELATED APPLICATIONS

This application claims the benefit of priority to Japanese Patent Application No. 2022-044135 filed on Mar. 18, 2022 and is a Continuation Application of PCT Application No. PCT/JP2023/008612 filed on Mar. 7, 2023. The entire contents of each application are hereby incorporated herein by reference.

BACKGROUND OF THE INVENTION

1. Field of the Invention

The present invention relates to ceramic electronic components such as capacitors, inductors, or varistors, in which outer electrodes are provided on a surface of a ceramic body including internal electrode layers.

2. Description of the Related Art

In a ceramic electronic component such as a capacitor, an outer electrode electrically connected to an internal electrode layer is provided on a surface of a ceramic body including the internal electrode layer. The outer electrode is usually provided with a base electrode layer including a conductive metal and glass because of the need to be in close contact with the ceramic body, and is configured such that the surface of the base electrode layer is covered with a Ni plating layer and further with a Sn plating layer in order to prevent erosion by solder used when being mounted on an electric circuit.

However, since a plating solution used in a plating process has high reactivity and elutes components having poor chemical resistance, the glass exposed on the surface of the base electrode layer is eroded, and the plating solution infiltrates pores generated by the erosion, thereby causing a problem in that the heat resistance and moisture resistance of the electronic component are reduced.

In particular, in recent years, as electronic products have been miniaturized and multifunctionalized, chip components have also been miniaturized and highly functionalized, therefore, the outer electrodes of ceramic electronic components have been thinned, and the problem of a decrease in heat resistance or the like due to the infiltration of a plating solution may become more apparent.

Therefore, it is required to develop a ceramic electronic component that prevents the infiltration of a plating solution into a base electrode layer in a plating process, and has excellent heat resistance and moisture resistance and high reliability.

SUMMARY OF THE INVENTION

Example embodiments of the present invention provide ceramic electronic components that prevent infiltration of a plating solution into a base electrode layer in a plating process for forming an outer electrode, and achieving excellent heat resistance and moisture resistance and high reliability.

In order to solve the problems, the present inventors have studied and discovered that the infiltration of a plating solution into the base electrode layer can be prevented by blending a $SiO_2$—BaO—$B_2O_3$—CaO-based glass into the base electrode layer of the outer electrode and covering the surface of the $SiO_2$—BaO—$B_2O_3$—Cao-based glass exposed on the surface of the base electrode layer with a protective layer including at least one of P, S, C, Si, Ba, F, N, Al, Sr, or B.

According to an example embodiment of the present invention, a ceramic electronic component includes a ceramic body including an internal electrode layer, and an outer electrode on a surface of the ceramic body and electrically connected to the internal electrode layer, in which the outer electrode includes a base electrode layer including a $SiO_2$—BaO—$B_2O_3$—CaO-based glass, a protective layer covering a surface of the $SiO_2$—BaO—$B_2O_3$—CaO-based glass exposed on a surface of the base electrode layer and including at least one of P, S, C, Si, Ba, F, N, Al, Sr, or B, and a Ni plating layer covering the base electrode layer and the protective layer.

Further, the protective layer may include a P element.

Further, a thickness of the protective layer may be equal to or more than about 1 nm and equal to or less than about 100 nm.

Further, a thickness of a thinnest portion of the base electrode layer is equal to or more than about 0.1 μm and equal to or less than about 5 μm.

Further, a thickness of the dielectric layer is equal to or more than about 0.3 μm and equal to or less than about 0.45 μm.

According to example embodiments of the present invention, it is possible to provide ceramic electronic components each capable of preventing infiltration of a plating solution into a base electrode layer in a plating process for forming an outer electrode, and having excellent heat resistance and moisture resistance and high reliability.

The above other and elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
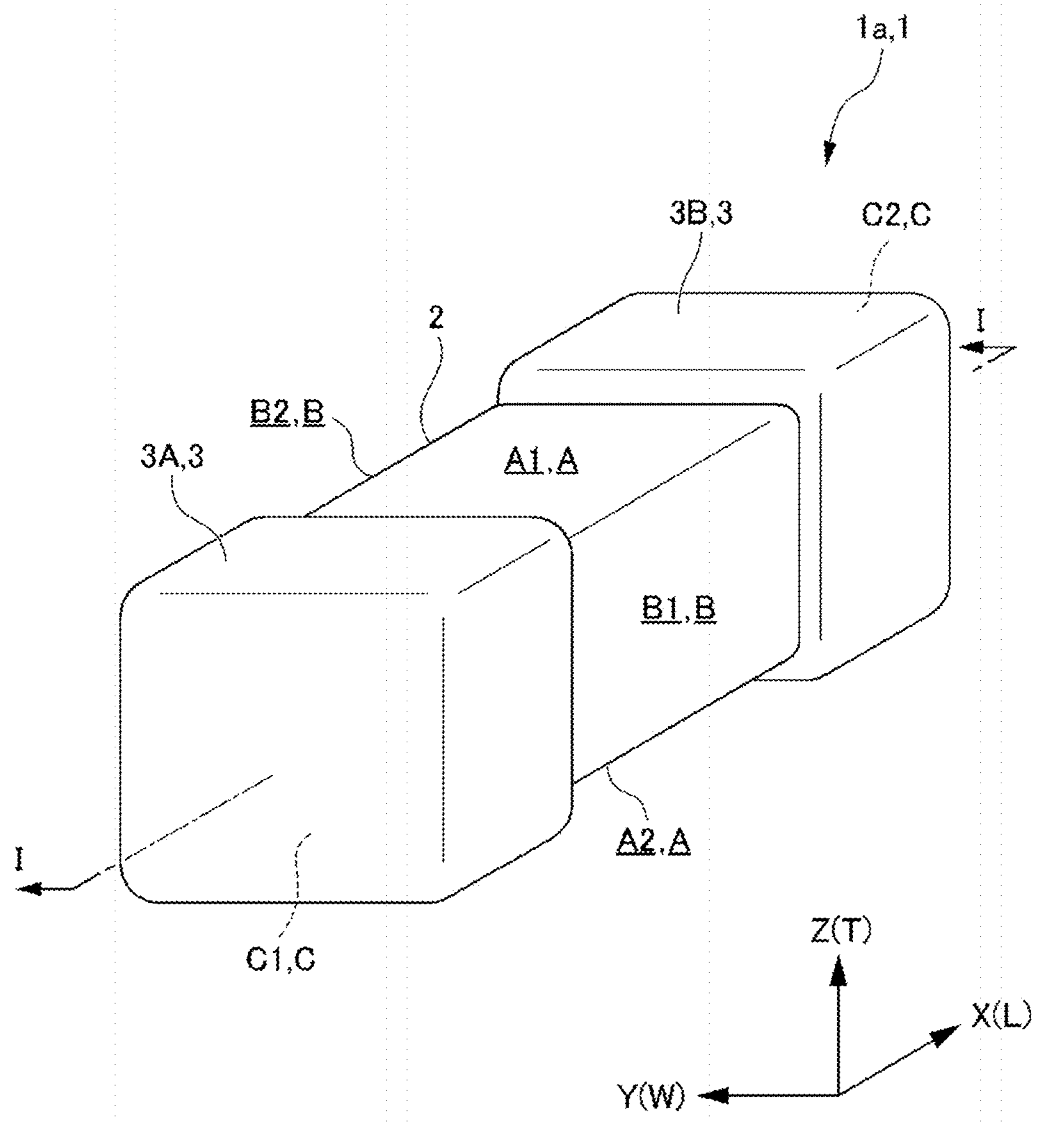
FIG. 1 is an external view of a ceramic electronic component.
Figure 2:
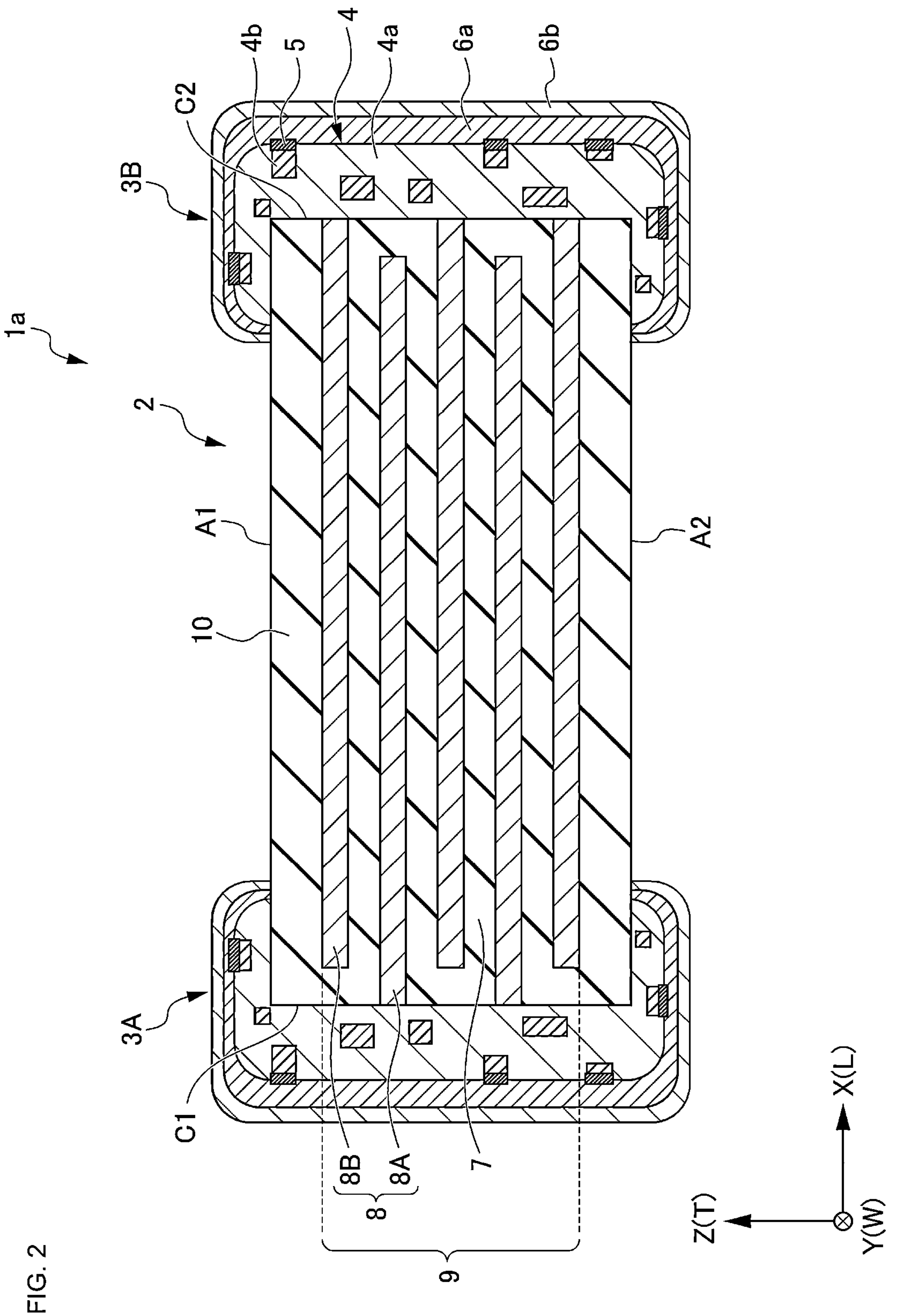
FIG. 2 is a conceptual view of a cross section taken along line I-I of FIG. 1.

Hereinafter, ceramic electronic components according to example embodiments of the present invention will be described. FIG. 1 is an external view of a ceramic electronic component 1. FIG. 2 is a conceptual view of the cross section of the ceramic electronic component 1 illustrated in FIG. 1 taken along line I-I.

Ceramic Electronic Component

The ceramic electronic component 1 is an electronic component in which an outer electrode electrically connected to an internal electrode layer is provided on the surface of a ceramic body including the internal electrode layer, and is incorporated in an electronic circuit such as a capacitor, an inductor, or a varistor, and is widely used. Hereinafter, a multilayer ceramic capacitor 1*a* will be described in detail as an example of a ceramic electronic component according to an example embodiment.

Multilayer Ceramic Capacitor

The multilayer ceramic capacitor 1*a* is a ceramic electronic component that has a substantially rectangular parallelepiped shape and includes a multilayer body 2 and a pair of outer electrodes 3 provided at both ends of the multilayer body 2. The multilayer body 2 includes an inner layer portion 9 in which a plurality of dielectric layers 7 and a plurality of internal electrode layers 8 are alternately stacked.

In the following description, as a term representing the orientation of the multilayer ceramic capacitor 1*a*, the direction in which the pair of outer electrodes 3 are provided in the multilayer ceramic capacitor 1*a* is defined as a length direction L. The direction in which the dielectric layer 7 and the internal electrode layer 8 are stacked is defined as a stacking direction T. The direction intersecting both the length direction L and the stacking direction T is defined as a width direction W. An XYZ orthogonal coordinate system is illustrated in FIG. 1. In the example embodiment, the width direction W is orthogonal to each of the length direction L and the stacking direction T, but the width direction W, the length direction L, and the stacking direction T are not necessarily orthogonal to each other, and may intersect each other.

Further, in the six outer surfaces of the multilayer body 2, a pair of outer surfaces opposed to each other in the stacking direction T are defined as a first main surface A1 and a second main surface A2, a pair of outer surfaces opposed to each other in the width direction W are defined as a first side surface B1 and a second side surface B2, and a pair of outer surfaces opposed to each other in the length direction L are defined as a first end surface C1 and a second end surface C2. Note that the multilayer ceramic capacitor 1*a* of the present example embodiment is used in a state where the second main surface A2 side is the mounting direction and the first main surface A1 is the upper side in many cases.

The first main surface A1 and the second main surface A2 will be collectively described as a main surface A when it is not necessary to particularly distinguish between them, the first side surface B1 and the second side surface B2 will be collectively described as a side surface B when it is not necessary to particularly distinguish between them, and the first end surface C1 and the second end surface C2 will be collectively described as an end surface C when it is not necessary to particularly distinguish between them.

Note that in the ceramic electronic component such as a multilayer ceramic capacitor, the elements listed as components to be blended are such that a prescribed element may be blended in a predetermined portion in any form such as a simple substance, a compound, a metal, an alloy, or a solid solution.

Multilayer Body

The multilayer body 2 includes the inner layer portion 9 and an outer layer portion 10 that is arranged in the stacking direction so as to sandwich the inner layer portion and defines the first main surface A1 and the second main surface A2.

Inner Layer Portion

The inner layer portion 9 is formed by stacking the plurality of dielectric layers 7 and the plurality of internal electrode layers 8. The inner layer portion includes equal to or more than 5 and equal to or less than 100 dielectric layers and internal electrode layers.

Outer Layer Portion

The outer layer portion 10 is arranged so as to sandwich the inner layer portion 9 in the stacking direction T, and defines the first main surface A1 and the second main surface A2. The outer layer portion 10 may be made of the same ceramic material as the dielectric layer 7 of the inner layer portion 9.

Dielectric Layer

The dielectric layer 7 can be obtained by sintering a ceramic green sheet obtained by forming a slurry in a sheet shape, the slurry being obtained by adding a binder, an additive such as a plasticizer or a dispersant, and an organic solvent to a mixture obtained by adding and mixing ceramic powder, glass particles, and a sintering aid as necessary. As the ceramic powder, for example, a ceramic material including barium titanate ($BaTiO_3$) as a main component can be used. Further, the main component may contain an accessory component such as a Mn compound, a Fe compound, a Cr compound, a Co compound, or a Ni compound.

The thickness of the dielectric layer 7 in the stacking direction T is preferably equal to or more than about 0.3 μm and equal to or less than about 0.45 μm, for example. This makes it possible to reduce the thickness of the multilayer ceramic capacitor and thereby reduce the size of the multilayer ceramic capacitor while maintaining the electrostatic capacitance, the dielectric breakdown strength, and the high temperature load life.

Internal Electrode Layer

The plurality of internal electrode layers 8 include a first internal electrode layer 8A and a second internal electrode layer 8B. The first internal electrode layer 8A is exposed at the first end surface C1 and connected to a first outer electrode 3A. In addition, the second internal electrode layer 8B is exposed at the second end surface C2 and connected to a second outer electrode 3B. The first internal electrode layer 8A and the second internal electrode layer 8B are usually alternately arranged in the stacking direction T with the dielectric layer interposed therebetween.

The internal electrode layer 8 is formed by applying an internal electrode paste to the surface of a ceramic green sheet constituting the dielectric layer and integrally firing the paste with the dielectric layer. In the internal electrode layer, the thickness in the stacking direction T can be set, but not particularly limited to, equal to or more than about 0.2 μm and equal to or less than about 2.0 μm, for example. As the material of the internal electrode layer, any metal such as Ni, Cu, Ag, Pd, Ti, Cr, and Au, or an alloy obtained by combining any of these metals can be used.

Outer Electrode

The outer electrode 3 includes the first outer electrode 3A provided on the first end surface C1 of the multilayer body 2 and the second outer electrode 3B provided on the second end surface C2 of the multilayer body 2. The outer electrode 3 can be obtained by forming the base electrode layer by applying a conductive paste to the entire end surface C and portions of the main surface A and the side surface B of the multilayer body and baking the conductive paste, and forming the plating layer on the base electrode layer. Note that the first outer electrode 3A and the second outer electrode 3B will be collectively described as the outer electrode 3 when it is not necessary to particularly distinguish between them.

Base Electrode Layer

A base electrode layer 4 is formed by applying and baking a conductive paste including a conductive metal and glass. The base electrode layer can be formed by a co-firing method in which the base electrode layer is fired simultaneously with the multilayer body or a post-firing method in which a conductive paste is applied to the fired multilayer body and then baked. The thickness of the thinnest portion of the base electrode layer in the length direction L is preferably equal to or more than about 0.1 μm and equal to or less than about 5 μm, for example. This is because when the thickness of the thinnest portion is below about 0.1 μm, it is difficult to form a uniform base electrode layer in mass production, whereas when the thickness of the thinnest portion exceeds about 5 μm, the outer electrode is increased in size, and it is difficult to reduce the size of the ceramic electronic component, for example. Note that the thinnest portion of the base electrode layer refers to a portion having the smallest value in the thickness in the length direction L of the base electrode layer 4 covering the end surface C of the multilayer body 2.

As the conductive metal contained in the conductive paste, for example, at least one metal selected from the group consisting of Cu, Ni, Ag, Pd, an Ag—Pd alloy, Au, and the like, or an alloy obtained by combining any of these metals can be used.

The conductive paste includes a $SiO_2$—BaO—$B_2O_3$—CaO-based glass, and the base electrode layer 4 in which a portion of a $SiO_2$—BaO—$B_2O_3$—CaO-based glass **4*b*** is exposed can be formed by baking the conductive paste. The $SiO_2$—BaO—$B_2O_3$—CaO-based glass is easily reacted with P, S, C, Si, Ba, F, N, Al and B, and a protective layer is easily formed.

Protective Layer

A protective layer 5 is formed so as to cover the surface of the $SiO_2$—BaO—$B_2O_3$—CaO-based glass **4*b* exposed on the surface of the base electrode layer 4**. The protective layer includes at least one element selected from the group consisting of P, S, C, Si, Ba, F, N, Al, and B, and particularly preferably includes P and B. The protective layer including P or B is formed as a film by immersing the multilayer body having formed the base electrode layer in a phosphate aqueous solution or a borate aqueous solution, respectively, to replace the $SiO_2$—BaO—$B_2O_3$—CaO-based glass.

The protective layer 5 covers the surface of the $SiO_2$—BaO—$B_2O_3$—CaO-based glass **4*b* exposed on the surface of the base electrode layer 4**, thereby preventing the plating solution from eroding the $SiO_2$—BaO—$B_2O_3$—CaO-based glass, and it is possible to prevent the heat resistance and moisture resistance from being reduced due to the generation of pores in the base electrode layer and the infiltration of the plating solution.

The thickness of the protective layer in the length direction L is preferably equal to or more than about 1 nm and equal to or less than about 100 nm, because the protective layer cannot reliably protect the $SiO_2$—Bao—$B_2O_3$—CaO-based glass when the thickness is below about 1 nm, whereas the outer electrode becomes large when the thickness exceeds about 100 nm, thereby making it difficult to reduce the size of the ceramic electronic component.

Plating Layer

A Ni plating layer **6*a* is formed so as to cover the surfaces of the base electrode layer 4 and the protective layer 5. The Ni plating layer can be formed by electrolytic plating. Further, a Sn plating layer 6*b* may be formed on the surface of the Ni plating layer 6*a*** by the same electrolytic plating to form a two-layered structure. The plating layer can prevent solder used for mounting the multilayer ceramic capacitor from eroding the base electrode layer.

Although example embodiments of the present invention have been described above, the present invention is not limited thereto, and various modifications can be made. In addition, the present invention is not limited to the multilayer ceramic capacitors, and can be widely for ceramic electronic components.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:

a ceramic body including an internal electrode layer; and an outer electrode on a surface of the ceramic body and electrically connected to the internal electrode layer; wherein the outer electrode includes:

a base electrode layer including a $SiO_2$—BaO—$B_2O_3$—CaO-based glass;

a protective layer covering a surface of the $SiO_2$—BaO—$B_2O_3$—CaO-based glass exposed on a surface of the base electrode layer and including at least one of P, S, C, Si, Ba, F, N, Al, Sr, or B; and a Ni plating layer covering the base electrode layer and the protective layer.

2. The ceramic electronic component according to claim 1, wherein the protective layer includes P or B.

3. The ceramic electronic component according to claim 1, wherein a thickness of the protective layer is equal to or more than about 1 nm and equal to or less than about 100 nm.

4. The ceramic electronic component according to claim 1, wherein a thickness of a thinnest portion of the base electrode layer is equal to or more than about 0.1 μm and equal to or less than about 5 μm.

5. The ceramic electronic component according to claim 1, wherein a thickness of the dielectric layer is equal to or more than about 0.3 μm and equal to or less than about 0.45 μm.

6. The ceramic electronic component according to claim 1, wherein the ceramic electronic component is a capacitor.

7. The ceramic electronic component according to claim 1, wherein the ceramic electronic component is an inductor.

8. The ceramic electronic component according to claim 1, wherein the ceramic electronic component is a varistor.

9. The ceramic electronic component according to claim 1, wherein the ceramic body is a multilayer ceramic body.

10. The ceramic electronic component according to claim 1, wherein the ceramic electronic component is a multilayer ceramic capacitor.

11. The ceramic electronic component according to claim 10, wherein the multilayer ceramic capacitor has a substantially rectangular parallelepiped shape.

12. The ceramic electronic component according to claim 10, wherein the ceramic body includes a plurality of dielectric layers.

13. The ceramic electronic component according to claim 12, wherein a thickness of each of the plurality of dielectric layers is equal to or more than about 0.3 μm and equal to or less than about 0.45 μm.

14. The ceramic electronic component according to claim 1, wherein a thickness of the internal electrode layer is equal to or more than about 0.2 μm and equal to or less than about 2.0 μm.

15. The ceramic electronic component according to claim 12, wherein an Sn plating layer is on the Ni plating layer.

16. The ceramic electronic component according to claim 1, wherein the base electrode layer is made of a conductive paste including a conductive metal and the $SiO_2$—BaO—$B_2O_3$—CaO-based glass.

17. The ceramic electronic component according to claim 1, wherein a portion of the $SiO_2$—BaO—$B_2O_3$—CaO-based glass is completely surrounded by the base electrode layer.

* * * * *